United States Patent
Ibek et al.

(10) Patent No.: US 11,483,742 B1
(45) Date of Patent: Oct. 25, 2022

(54) SYSTEM AND METHOD FOR A DISTRIBUTED LEDGER FOR BASE STATION SLICING USING BLOCKCHAIN

(71) Applicant: NETSIA, INC., Sunnyvale, CA (US)

(72) Inventors: Onur Ibek, Istanbul (TR); Oguz Oktay, Istanbul (TR); Seyhan Civanlar, Istanbul (TR)

(73) Assignee: Netsia, Inc., Santa Clara, CA (US)

(*) Notice: Subject to any disclaimer, the term of this patent is extended or adjusted under 35 U.S.C. 154(b) by 0 days.

(21) Appl. No.: 17/301,223

(22) Filed: Mar. 29, 2021

Related U.S. Application Data

(63) Continuation of application No. 16/041,732, filed on Jul. 20, 2018, now Pat. No. 10,972,942.

(51) Int. Cl.

| | |
|---|---|
| *H04W 28/26* | (2009.01) |
| *H04W 48/18* | (2009.01) |
| *H04L 41/0893* | (2022.01) |
| *H04L 9/06* | (2006.01) |
| *H04W 28/20* | (2009.01) |
| *H04L 9/00* | (2022.01) |

(52) U.S. Cl.
CPC .......... *H04W 28/26* (2013.01); *H04L 9/0618* (2013.01); *H04L 41/0893* (2013.01); *H04W 28/20* (2013.01); *H04W 48/18* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2015/0271681 A1* | 9/2015 | Perez | H04W 72/0486 370/235 |
| 2016/0234828 A1* | 8/2016 | Smith | H04W 16/14 |
| 2017/0295232 A1 | 10/2017 | Curtis | |
| 2018/0146071 A1* | 5/2018 | Himayat | H04L 41/5025 |
| 2019/0174563 A1* | 6/2019 | Dowlatkhah | H04W 24/02 |
| 2019/0236606 A1* | 8/2019 | Padmanabhan | H04L 9/3239 |
| 2019/0260592 A1 | 8/2019 | Nguyen et al. | |

(Continued)

OTHER PUBLICATIONS

Dr. Gavin Wood, "Ethereum: a Secure Decentralised Generalised Transaction Ledger," Published 2016, 29 pgs.

(Continued)

*Primary Examiner* — Shripal K Khajuria
(74) *Attorney, Agent, or Firm* — Shumaker & Sieffert, P.A.

(57) ABSTRACT

A system and method for reliable and secure record keeping for Radio Access Network (RAN) capacity sharing amongst a plurality of operators using slicing methods according to 3GPP 5G specifications, wherein slicing is controlled by a RAN controller is disclosed. The record keeping system is a distributed Blockchain ledger in which a block specifies information pertaining to available, leased or purchased base station slice(s). The ledger is immutable and available to all operators through a distributed database hosted by each participant wherein each base station owner advertises its leased as well as unused base station capacity at a specific time using blocks in the Blockchain. In an embodiment, the RAN controller directly feeds the information needed to form a new block into the ledger whenever the slicing profile of a RAN changes, thereby making the ledger in complete synchronicity with the network.

18 Claims, 4 Drawing Sheets

(56) References Cited

U.S. PATENT DOCUMENTS

2020/0007513 A1 1/2020 Gleichauf
2020/0367129 A1* 11/2020 Raheem .............. H04W 36/165

OTHER PUBLICATIONS

"Hyperledger Architecture, vol. 1: Introduction to Hyperledger Business Blockchain Design Philosophy and Consensus," white paper, 15 pgs.
Nakamoto, "Bitcoin: A Peer-to-Peer Electronic Cash System," white paper, 2008 9 pgs.
Prosecution History for U.S. Appl. No. 16/041,732, dated Jan. 24, 2020 to Dec. 8, 2020, 56 pp.

* cited by examiner

SYSTEM AND METHOD FOR A DISTRIBUTED LEDGER FOR BASE STATION SLICING USING BLOCKCHAIN

CROSS REFERENCE

This application is a continuation of U.S. patent application Ser. No. 16/041,732, filed 20 Jul. 2018, the entire contents of which is incorporated herein by reference.

BACKGROUND OF THE INVENTION

Field of Invention

The present invention relates to a Blockchain-based distributed ledger system as a Radio Access Network (RAN) sharing record platform to be used by plurality of mobile operators.

Discussion of Related Art

Sharing of the Radio Access Network (RAN), also known as RAN-sharing, was an idea originally proposed by mobile operators to aid shortage of money for investment into network infrastructure caused by extremely high license fees. RAN-sharing is viewed as a mechanism to shorten the network deployment period while greatly reducing operation costs. It was initially attractive mostly to small and medium size mobile operators, but now it has been widely implemented bi-laterally between many large mobile operators. In RAN-sharing, the sharing operators keep their own core network infrastructure, and services. They also have independent provisioning and billing systems, only sharing the base stations that are connected to the core network of multiple operators. In doing so, they effectively save time and cost in finding an appropriate base station site, in the physical deployment of the site, and equipping it with transmission facilities and radio equipment.

While RAN-sharing was happening in an ad-hoc way, 3GPP developed two key standards: TR 22.951 V8.1.0 (service aspects and requirements for network sharing) and TR23.251 V8.1.0 (network sharing architecture and functional description) that define two options for RAN-sharing: Multiple Operator Core Networks (MOCN) and Gateway Core Network (GWCN). These options describe clearly how to provide traffic separation in a shared RAN to achieve RAN-sharing between many operators.

RAN-sharing offers an extremely attractive value combination for operators, but there are key problems to be considered and solved in terms of operation and maintenance: (a) the current model is typically based on bi-lateral agreements between operators for prolonged time periods (e.g., 10 years), which puts them into an obligation for a long time period, (b) if the requirements (capacity, QoS, service level agreement (SLA) requirements etc.) change there is no flexibility in the sharing arrangement which is sealed through a contract, (c) because the process of configuring the services onto the RAN for each operator on a manual basis, it is not flexible enough to meet changing traffic needs. Therefore, a more automated and short-term lease-based RAN sharing is needed.

A RAN is comprised of a number of base stations that is normally configured to connect to a core network (CN) of a mobile operator upstream from the base stations, but it may also be configured to connect to a plurality of core networks wherein each core network belongs to a different mobile operator. Doing so, the user equipment (UE) such as a smart phone, tablet or PC can access the plurality of mobile operators network via the shared RAN. The term upstream or uplink indicates the communication direction from the UE towards the core network, whereas the term downstream or downlink indicates from the core network towards the UE. The base station comprises a radio transmission and/or reception unit, one or more antennas and a base station controller (BSC), all configured to establish communication over a radio interface with the UEs.

Using the Multi Operator Core Network (MOCN), an approach defined by 3GPP, the shared base station simultaneously broadcasts a plurality of public land mobile network identifier (PLMN IDs) to the UE, each PLMN ID being associated with an operator's network sharing that base station. When the UE attempts to attach the base station with one of these PLMN IDs, the shared-RAN completes the UE attach procedure by sending the request towards the Mobility Management Entity (MME) of the core network that belongs to the operator with that PLMN ID. The UE attach procedure is well known in prior art and hence will not be detailed here.

SUMMARY OF THE INVENTION

When a RAN is shared, the usage of base station resources must be obtained and stored for proper reporting. The usage resources used by each UE are:

(a) the number of LTE resource blocks (using a time-frequency grid) used up;

(b) the data throughput (or bandwidth) used on the link between the UE and the base station that can be estimated from the number of IP packets or bytes transmitted on the uplink and/or downlink of the communication;

(c) transmission power level used up by the base station for the specific UE communications.

In one embodiment, the slice parameters may be estimated using a combination of above three parameters and the volume of UEs. The usage parameters can be obtained either from the Element Management System (EMS) of the base station or it can also be measured from the S1-U interface between the base station and MME, wherein the communications with a specific UE is tracked. Both methods are known in prior art.

Programmable networks and specifically Software Defined Networking (SDN) concepts are broadly applicable to transport services such as switching and routing as well as physical and MAC layers. SDN in networking means a control plane that is decoupled from the data plane of forwarding functions and assigned to a logically centralized controller, which is the 'brain' of the network. The SDN architecture, with its software programmability, provides agile and automated network configuration and traffic management that is vendor neutral and based on open standards. Network operators, exploiting the programmability of the SDN architecture, are able to dynamically adjust the network's flows to meet the changing needs while optimizing the network resource usage. The controller is the central control point of an SDN and hence vital in the proper operations of network switches.

Programmable RAN is a prior art concept that relies on principles of SDN for remotely configuring base stations with different configurations for different traffic flows, i.e., achieving 'slicing' of a base station. The key concepts of RAN slicing essentially allow groups of users or applications to be treated differently by employing a different configuration file per user group within the base station. The uplink/downlink resource utilization and the scheduler components can be individually programmed for each user group. Just like RAN slicing principles being applicable to different user groups of an operator, it is also applicable to the case of users of different mobile operators. The brain of RAN slicing is the 'RAN Controller', which can program one or more base stations according to user groups, application profiles or mobile operators. In RAN slicing, the base stations form the data plane while the RAN Controller acts as the controller.

Instead of looking at a RAN as a collection of independent base stations, the 'programmable RAN' paradigm argues that all base stations deployed in a geographical area can be abstracted as a virtual big-base station which is made up of distributed radio elements (i.e., the individual physical base stations). Instead of assuming that each base station has its own set of resources, programmable RAN (a) assumes that all neighboring base stations are allocating from a fixed set of shared radio resources which form a three dimensional grid of space, time, and frequency slots; and (b) program them in a software defined fashion (as in an SDN) through a logically centralized radio access network (RAN) controller. With a control channel between each base station and the controller, base stations provide updated global view of the network to the controller, and allow the controller to communicate radio resource management decisions back to the base stations.

RAN Controller allocates a group of resource blocks to each radio subscriber/subscriber group. LTE uses OFDMA, where radio resources are split into time and frequency slots, called 'resource blocks'. The channel quality and the interference for each subscriber can vary across these resource blocks; hence, they must be smartly shuffled between the contending subscribers. It also assigns transmit power values to each resource block at each base station while conforming to overall transmit power constraints. This major shift from the notion of a fixed base station configuration to a programmable configuration allows a much more efficient utilization of wireless network resources and instant reconfiguration to meet the needs of end devices.

Although currently base stations are owned by operators, one can conceive non-operator base station owners that are simply telecommunications infrastructure providers that do not own any subscribers, and therefore, do not use the infrastructure for services to end customers. Operators can share the base station capacity of such infrastructure providers on a short-term lease basis as well. In this invention, we use the term 'base station owner' so that such infrastructure owners are included as well as operators as base station owners.

When the base station capacity is sliced nationwide and distributed amongst the operators on a lease basis, a reliable record keeping database is needed (i) to verify such transactions, (ii) to keep a record of it, and (iii) to form basis for contracts between leaser and lease. Just the number of base stations nationwide in developed countries varies between 100,000 to 4,000,000 depending on the size of the country. When base stations are sliced, there are millions of records that change over time.

Blockchain is a distributed transaction database among multiple computing devices. A Blockchain is formed from blocks, with each block having information related to a transaction and linking to a prior block in the chain. The computing devices can each have copies of the Blockchain as new blocks are generated, so that no centralized or official copy of the Blockchain exists and no computing device is trusted more than any other computing device. When a user initiates a transaction, some or all of the computing devices can verify the transaction.

The data in the Blockchain is called 'immutable', meaning it is impossible to alter. Written once, the information in a block cannot be edited, thus it is essentially 'read only'. Once created, the record cannot be edited or deleted. This makes them immutable and historically very accurate. You can think of it as an ever-growing journal that is constantly having new pages added to it over time. This is the strength of the blockchain database design that has been effectively used to enable Bitcoin™ to be so effective as a money ledger.

The other core feature of Blockchain is that it is secured by highly complex mathematics and distributed making it practically impossible to manipulate. Blockchain database is different from conventional databases, where data is housed in a certain data structure (like arrays or tables) and controlled through a centralized administration function that is given to an administrative user. This approach opens up the whole system to the end user.

In Blockchain, the blocks are simply tables and transactions as records. The major difference however is that blocks are linked (each block contains the hash of the previous block) and each transaction references the transaction output of the previous transaction. In some way, this acts like a foreign key. What you store in that block/transaction is up to the specific application using Blockchain. However, it is able to do more than a normal database that acts as a ledger because it can also provide 'services'. For example, it can be associated with so called 'Smart Contracts' that can perform other related transactions such as exchange of crypto-currency for information in the block.

The system and method of this invention (a) utilize the programmability of a base station using the RAN controller, (b) allow sharing of RAN resources on a short-term basis using RAN slicing, (c) allow pooling of RAN capacity from a large number of operators and infrastructure providers, (d) store reliable and immutable recordation of shared base station capacity in a Blockchain ledger wherein each block represents at least one slice or a specific grouping of slice(s), (e) an interface application between the RAN controller and the Blockchain ledger to translate base station resource data into a form usable by the Blockchain software and vice versa, and (f) a ledger browser designed for operators to interface with the distributed ledger, displaying user friendly slice information and allowing base station slice requests.

The system and method of this invention can utilize one or more of the existing open source or commercial blockchain platforms. An exemplary platform suitable for the implementation of embodiments is Ethereum. The paper entitled "Ethereum: A Secure Decentralised Generalised Transaction Ledger" by Wood, 2015, provides a formal definition of a generalized transaction-based state machine using a blockchain as a decentralized database. It should be noted that any suitable blockchain implementation can be used to provide a trust layer, including, but not limited to, Ethereum, Hyperledger and Bitcoin™. Hyperledger is a project of the Linux Foundation. The present disclosure is not limited to the use of the above platforms.

Embodiments of the present invention are an improvement over prior art systems and methods.

In one embodiment, the present invention provides a method comprising: (a) determining base station capacity of a plurality of base stations owned by at least one mobile operator; (b) slicing determined base station capacity of the plurality of base stations determined in (a) into one or more slices, wherein each slice in the one or more slices are generated by a Radio Access Network (RAN) controller, each unused slice usable by another mobile operator either on a short-term basis or long-term basis, wherein the another mobile operator is different than the at least one mobile operator, and wherein each unused slice is either allocated or made available to the another mobile operator; and (c) translating information associated with one or more slices into transactions in a block, and storing the block in a blockchain ledger and distributing the blockchain ledger to one or more peer ledgers.

In another embodiment, the present invention provides a method comprising: (a) determining base station capacity of a plurality of base stations owned by at least one mobile operator; (b) slicing determined base station capacity of the plurality of base stations determined in (a) into one or more slices, wherein each slice in the one or more slices are generated by a Radio Access Network (RAN) controller, each unused slice usable by another mobile operator either on a short-term basis or long-term basis, wherein the another mobile operator is different than the at least one mobile operator, and wherein each unused slice is either allocated or made available to the another mobile operator; (c) translating information associated with one or more slices into transactions in a block; (d) storing the block in a blockchain ledger and distributing the blockchain ledger to one or more peer ledgers; and (e) viewing transactions in the block in the form of slice information.

In yet another embodiment, the present invention provides a system that comprises the components of: (a) a Radio Access Network (RAN) controller determining base station capacity of a plurality of base stations owned by at least one mobile operator, slicing determined base station capacity of the plurality of base stations determined in (a) into one or more slices, wherein each unused slice is usable by another mobile operator either on a short-term basis or long-term basis, and wherein the another mobile operator is different than the at least one mobile operator, and wherein each unused slice is either allocated or made available to the another mobile operator; (b) a distributed blockchain ledger recording slice transactions within a block wherein the blockchain ledger is distributed to all mobile operators in the system; (c) an application, communicating with blockchain ledger, converting between slice information and transactions in the block; and (d) a ledger browser application for viewing slice information.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
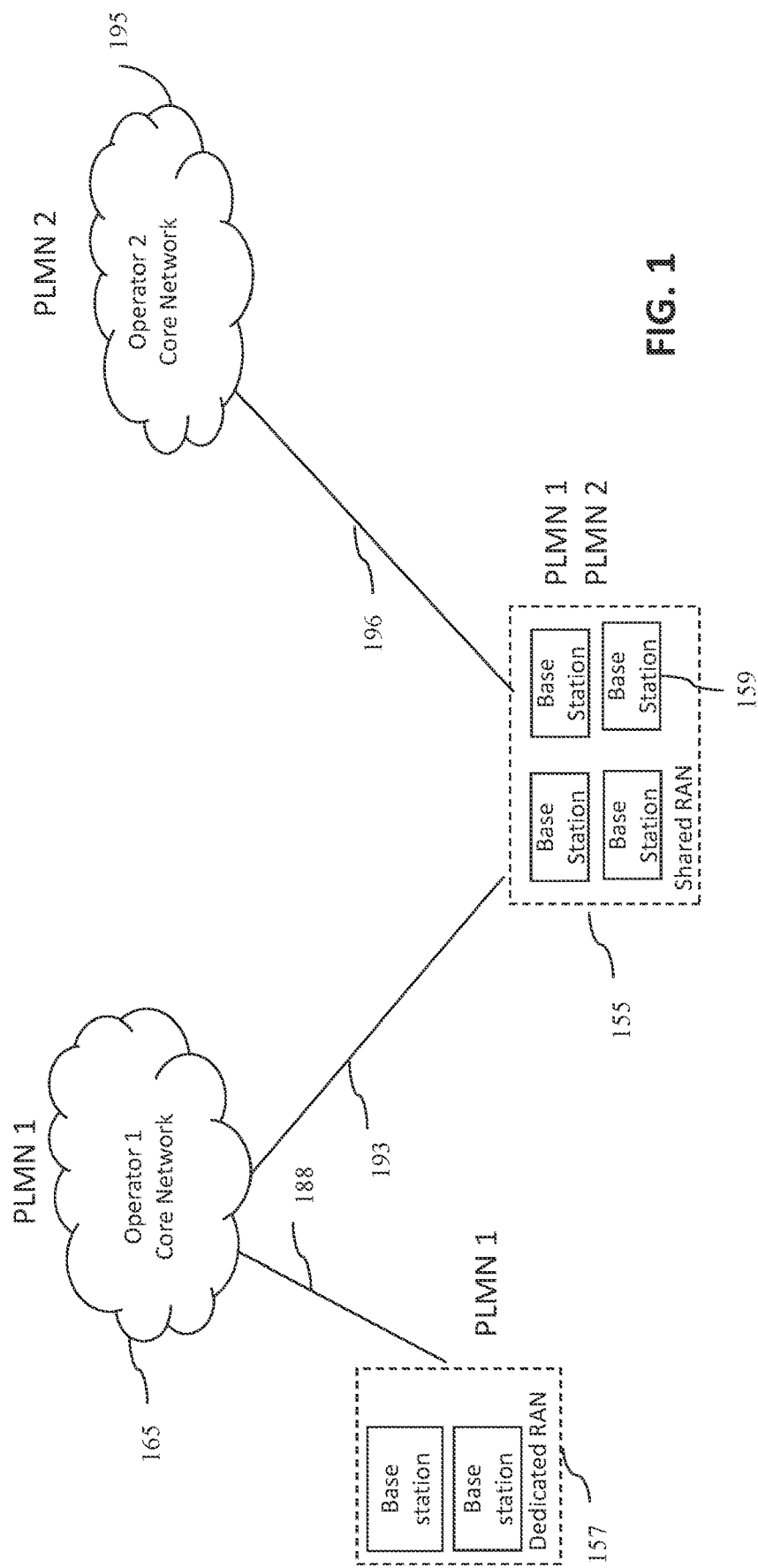
FIG. 1 illustrates a RAN sharing between two operators according to prior art.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., base station, agent or controller) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware. As used herein, a network device is a piece of networking equipment, including hardware and software that communicatively interconnects other equipment on the network (e.g., other network devices, end systems). A network device is generally identified by its media access (MAC) address, Internet protocol (IP) address/subnet, network sockets/ports, and/or upper OSI layer identifiers.

A Radio Access Network (RAN) is comprised of one or more base stations. A base station provides cellular connection of user equipment (UE)s to a mobile operator's core network. The base station is connected to an antenna (or multiple antennas) that receives and transmits the signals in the cellular network to cellular phones and other cellular devices (known as UE). The RAN is connected to mobile operator's Core Network (CN) to transmit data end to end.

Unless specified otherwise, the embodiments of the invention apply to any RAN Controller of the layered network architecture, i.e., they are NOT limited to an SDN type controller. Although RAN Controller is shown to have a remote communication with all base stations, it is possible to implement it one of the base station hardware.

Note while the illustrated examples in the specification discuss mainly a programmable radio access network (RAN) relying on the SDN paradigm of having a separate controller(s) to manage network resources in communications with a group of base stations, embodiments of the invention may also be implemented in other types of software defined radio networks. It can be implemented in any layered network architecture wherein there is a control infrastructure separated from wireless data transmission that can be instructed to change the allocation of resources to wireless end devices. Unless specified otherwise, the embodiments of the invention apply to any programmable or software defined RAN controller.

FIG. 1 illustrates Operators 1 and 2 sharing a RAN that belongs to an infrastructure provider. 3GPP specifications 22.951 and 23.251 describe the network sharing requirements and architecture. The main feature that allows network sharing in LTE is the ability of the base station to broadcast multiple PLMN IDs towards the UE during the attachment process. Each operator has a unique Public Land Mobile Network (PLMN) ID, which is a combination of Mobile Country Code and Mobile Network Code. The UE is expected to select the PLMN ID based on its programmed selection process. The base station in turn uses this PLMN ID to select the operator Core Network to connect to. This method is called Multi Operator Core Network (MOCN). In FIG. 1 Operator 1's core network 165 exposes its Mobility Management Entity (MME) and Serving Gateway (S-GW) towards the base station of the shared RAN 155, which is comprised of at least one base stations 159. Similarly, Operator 2's core network 195 exposes its MME and S-GW towards shared RAN 155. Note that, Operator 1 has PLMN 1 and Operator B has PLMN 2. Therefore, base station 159 in shared RAN 155 must broadcast both PLMN 1 and 2. The control traffic of UEs that attach to Operator A are routed towards Operator 1's MME and data traffic towards the S-GW. Similarly, the control traffic of UEs that attach to Operator 2 are routed towards Operator 2's MME and data traffic towards its S-GW. Operator 1 may also have dedicated RAN 157, to which only UEs of Operator 1 are attached. Meaning, the MME and S-GW are shared across dedicated and shared RAN components.

The RAN sharing as depicted in FIG. 1 is based on contractual arrangements for resource sharing between different Operators. A more powerful approach is to perform RAN sharing using the 'slicing' approach of a programmable RAN. Instead of assuming that each base station has a fixed set of resources allocated to different Operators, in programmable RAN, each base station can be reprogrammed through a logically centralized RAN Controller such that resources are reallocated on-demand and in real-time. With a control channel between each base station and the RAN Controller, base stations can provide their most recent updated global view of resource usage, and allow the controller to communicate radio resource management decisions back to the base station.

Figure 2:
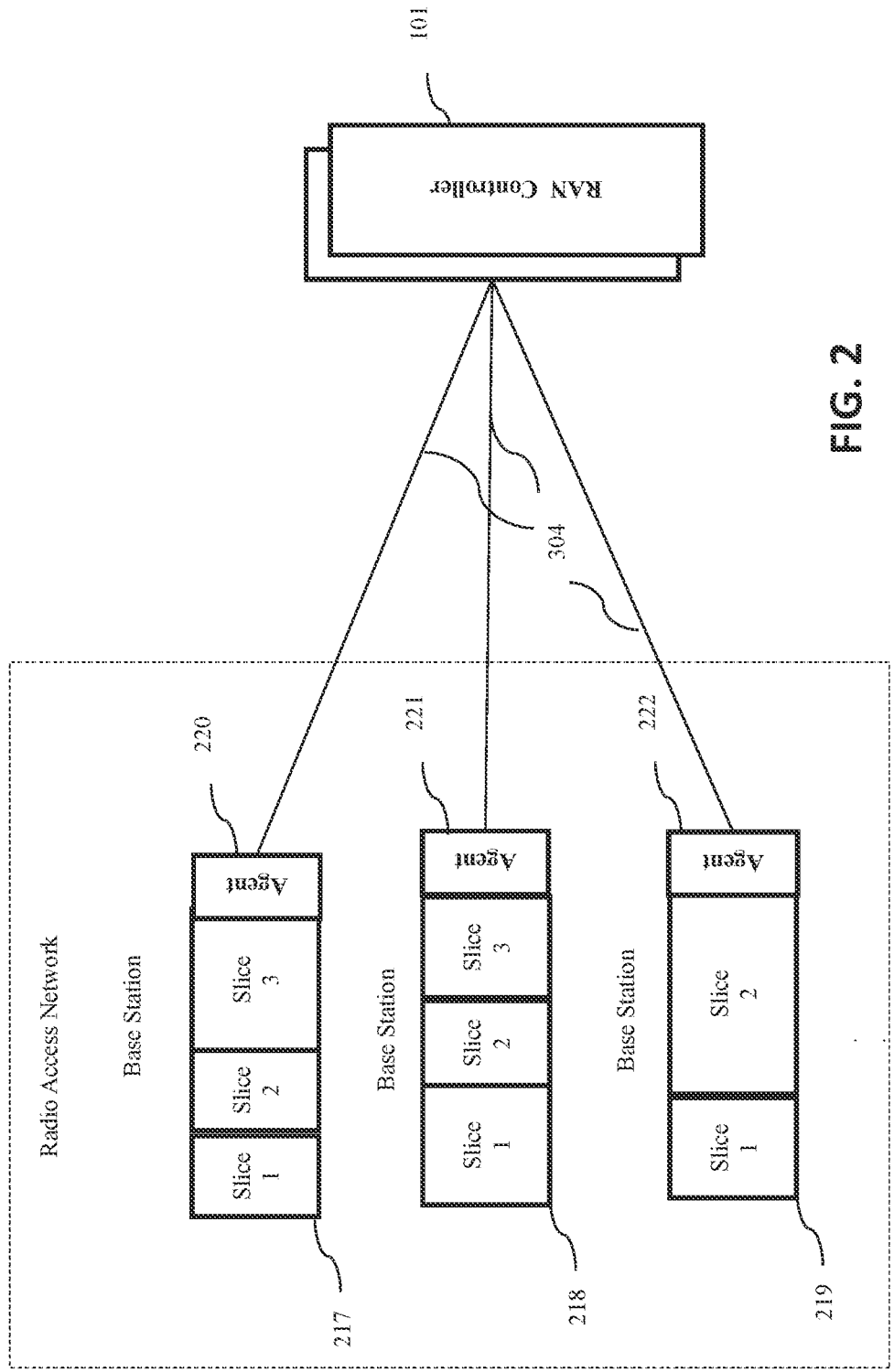
FIG. 2 illustrates base station slicing using a RAN Controller according to prior art.

FIG. 2 illustrates a simple exemplary network with a RAN comprised of base stations 217, 218 and 219. Each base station has an 'Agent' component 220, 221, and 222, in communications with centralized RAN Controller 101. The interface 304 between RAN Agents 220, 221, and RAN Controller 101 is an Open API. In one embodiment, the Open API on interface 304 is a Representational State Transfer (REST) API, which allows sending an HTTP/HTTPS GET message using the other end point's IP address. That message would contain a URI string referencing the relevant network end point and comprising an HTTP payload with a JSON (JavaScript Object Notation) header that has the proper parameters for a particular interface and statistic. As a quick background, JSON is used in Javascript on the Internet as an alternative to XML for organizing data. Just like XML, JSON is language-independent and may be combined with C++, Java, Python, Lisp and many other languages. Unlike XML, however, JSON is simply a way to represent data structures, as opposed to a full markup language. JSON consists of "name:object" pairs and punctuation in the form of brackets, parentheses, semi-colons and colons. Each object is defined with an operator like "text:" or "image:" and then grouped with a value for that operator. A high-level two way messaging can be defined between Agents 220, 221, 222 and RAN controller 101. This interface is used to manage the profile database within RAN Controller 101. "RB (Resource Block) Rate", "Scheduler Type" and "IMSI list" are a few of the profile attributes to be used for the scheduling of resources of the base station. As illustrated in FIG. 2, each base station can be sliced differently. While base station 217 and 218 are sliced into three different slices with each slice having a different profile defining different resource usage, base station 219 has only two slices. The slices can be allocated/leased to the same or different operators. If a slice is allocated, then the associated provisioning file of the leasing operator defining how services are delivered must also be downloaded onto the base station. An exemplary profile of a slice is defined by (a) uplink and downlink usage percentages in bit per second, (b) the number of resource blocks usable, and (c) the MAC scheduler type usable. A 'resource block' for LTE is defined in prior art as the smallest unit of resources that can be allocated to a user. The resource block is 180 kHz wide in frequency and 1 slot long in time. In frequency, resource blocks are either 12×15 kHz subcarriers or 24×7.5 kHz subcarriers wide. The number of subcarriers used per resource block for most channels and signals is 12 subcarriers. Although the term 'resource block' is used for LTE, other resource representations may be used in 5G and beyond, and should be considered covered by this embodiment. A 'MAC Scheduler' (or scheduler in short) within the base station determines how the downlink and uplink channels are used. The scheduler assigns these resources in such a way as to satisfy QoS requirements and optimize system performance.

Figure 3:
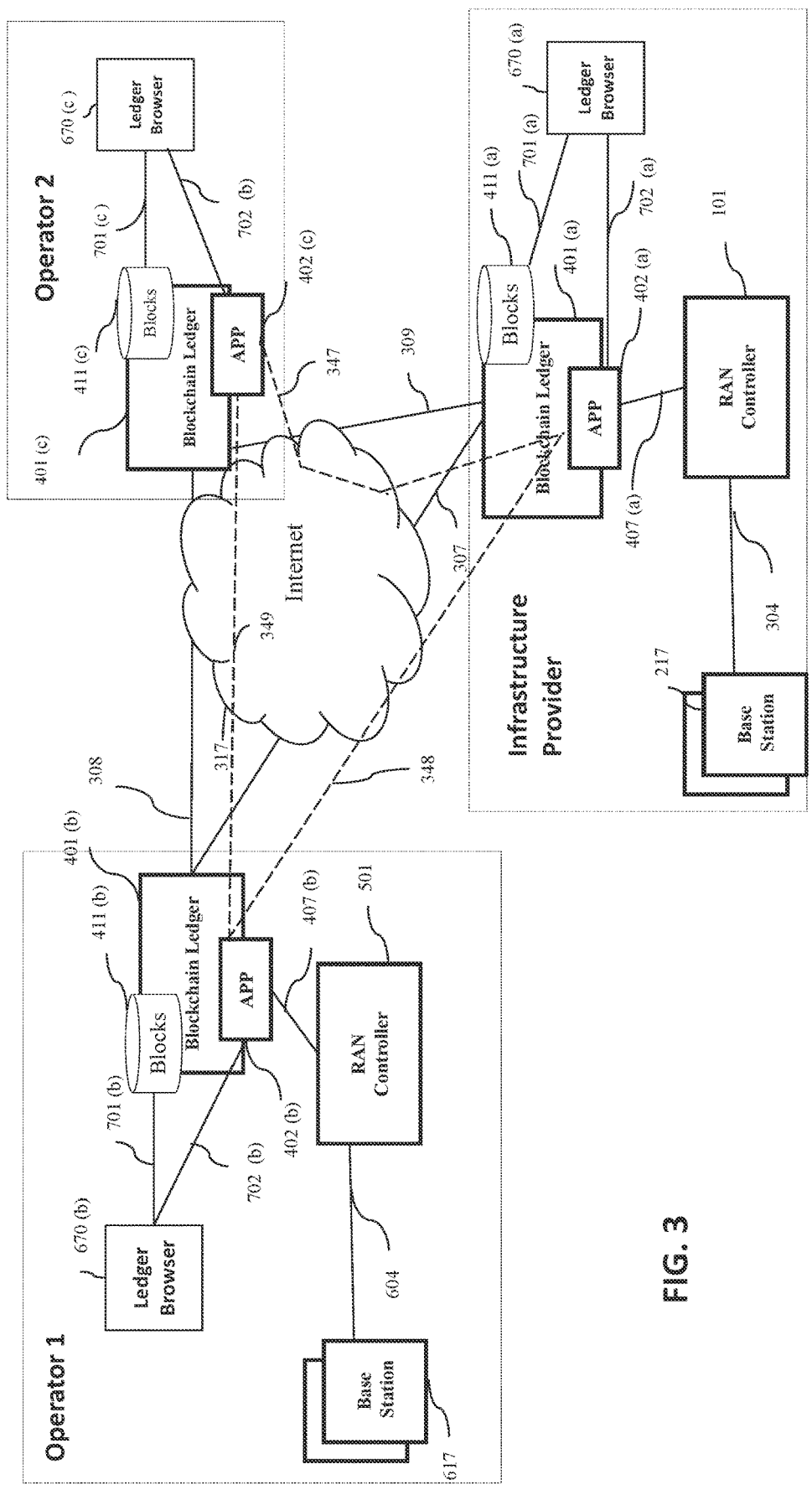
FIG. 3 illustrates an embodiment of the system of invention with the Blockchain ledger.

FIG. 3 illustrates an embodiment of the invention with an infrastructure provider and two operators, Operator 1 and Operator 2, wherein Operator 2 does not have any RAN infrastructure. RAN Controller 101 of infrastructure provider and RAN Controller 501 of Operator 1 are connected to their associated base stations 217 and 617, with interfaces 304 and 604, respectively.

Blockchain Ledger 401(*a*), (*b*) and (*c*) are the distributed databases located in various sites of the operators and infrastructure owners, and contain blocks database 411(*a*), (*b*) and (*c*) which are replicas. Each Block in Blockchain Ledger 401 is a collection of transactions, each transaction representing at least one slice of base stations 217 and 617 available to operators' use or that is readily allocated to an operator. A transaction in a Block contains information that describes a slice such as:

Base Station ID/Name
Slice ID/Name
Owner ID/Name
Base Station location
Handover Thresholds
Admission Control
Attached MME
QoS Parameters
Slice Downlink and Uplink Capacity Descriptor
Slice Scheduler Descriptor
Slice IMSI list
Slice Duration
Slice Lease Price
Slice State (free, unavailable, leased, etc.)
Leasing Operator ID (if leased)
Etc.

There are many different embodiments for Block definition. However, all Blocks 411 (a), (b) and (c) are formed by creation and modification transactions of some or all of slice attributes listed above. A block may contain no transactions, if the ledger is updated at a configured time interval and there has been no change in the slice configurations. A block may contain slicing info transactions of;

One base station used by only one operator.
One base station shared by multiple operators.
Multiple base stations with a predefined location criteria (Location Area Code (LAC), per MME, ZIP, town, city, state, country, etc.) and are used by only one operator.
Multiple base stations with a predefined location criteria (Location Area Code (LAC), per MME, ZIP, town, city, state, country, etc.) and shared by multiple operators
All base stations controlled by a single RAN controller that is only used and owned by a single operator.
All base stations controlled by multiple RAN controllers that are only used and owned by a single operator.
All base stations controlled by a single RAN controller that is shared by multiple operators.
All base stations controlled by multiple RAN controllers that are shared by multiple operators.
All base stations controlled by a hierarchical RAN controller that controls the RAN controllers underneath.
All base stations nationwide.

In an embodiment, Application (APP) 402 (a), (b) and (c) is used to securely interface with Blockchain Ledger 401 (a), (b) and (c) and Ledger Browsers 670 (a), (b) and (c). If there is a RAN controller, APP interfaces with said RAN controller with interface 407 (a) and (b) to receive slice information updates wherein the slice attributes listed above are in each update message, or alternatively APP may be a component of the RAN controller. APP translates the information into a form that the specific Blockchain software can process and put into the form of a transaction in a Block. APP may optionally have a database (not shown in the figure) containing static or semi-dynamic base station and slice attributes that are not communicated via the RAN controller interface 407 (a) and (b) each time there is a new transaction, such as base station ID, base station name, base station geographic location, leaser ID, and price, etc.

APP 402 (a), (b) and (c) communicate with each other using interfaces 347, 348, and 349, shown pairwise. This interface can be a simple web-based interface over the public Internet, and used, for example, to request a slice on another APP's associated base station.

Blockchain Ledgers 401 (a), (b) and (c) communicate with each other using interfaces 307, 308 and 309, shown pairwise over the public Internet. This interface is used to keep their Ledger databases in complete synchronicity.

In an embodiment, Ledger Browser 670 (a), (b) and (c) is an application designed as a mobile application, a web application, or a computer application that allows browsing of information in the blocks using a graphical user interface (GUI). Ledger Browser 670 translates block data into a meaningful and useful information viewable by administrators of an operator. It may display the geographic location of each base station using map software such as 'google maps'. It may also display slice information on each base station. The Ledger Browser may also be used to send a leasing request of a specific slice to the leaser.

Figure 4:
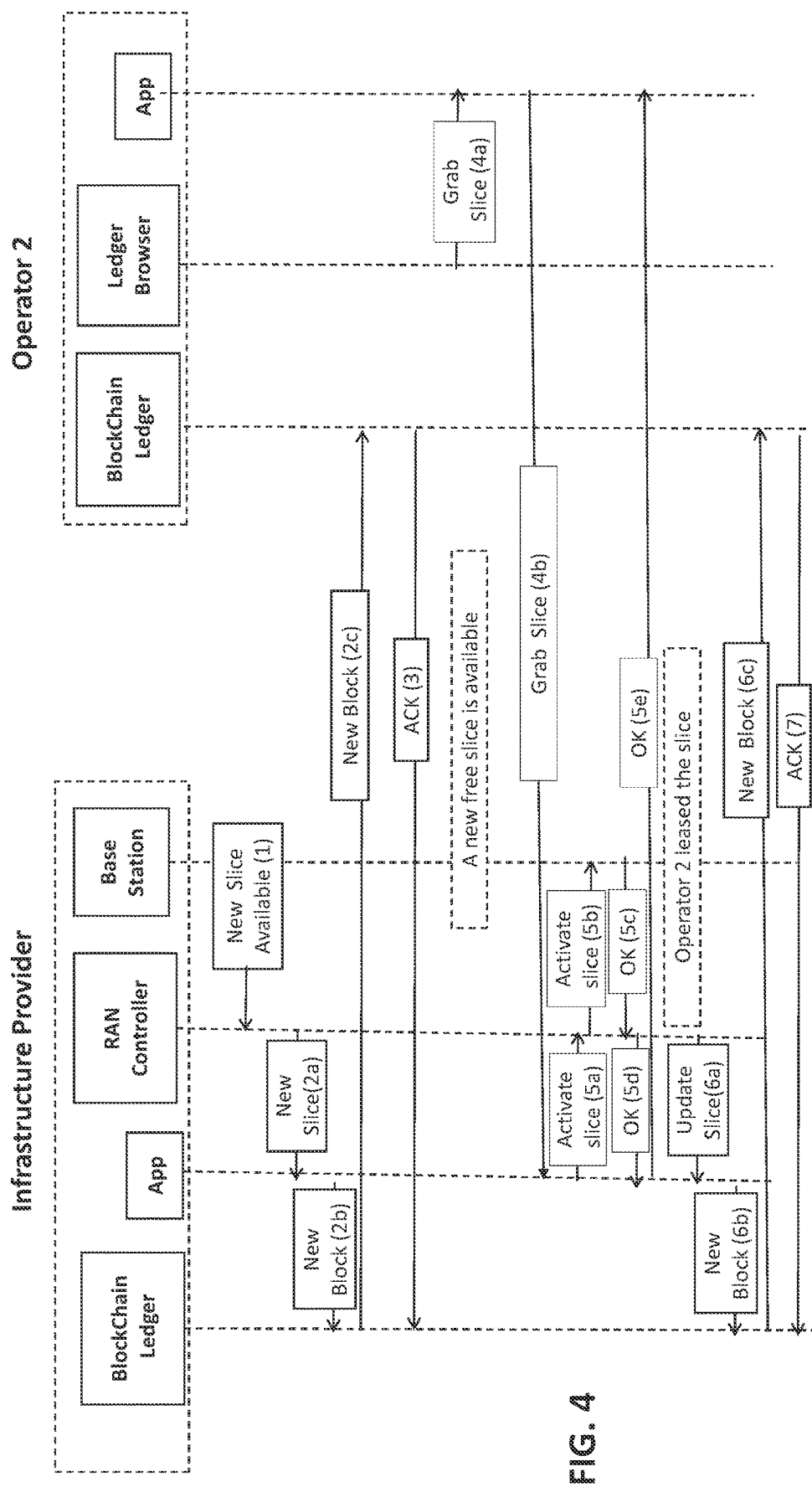
FIG. 4 illustrates an exemplary sequence of interactions between components of the system of invention.

FIG. 4 illustrates a simple sequence of interactions between an infrastructure provider with a shared base station and a RAN controller and Operator 2, which requests a slice from infrastructure provider according to an aspect of this invention. For simplicity, we assumed that each slice transaction is a new block. When a new slice becomes available on base station, in step 1 base station uses interface 304 to announce the availability to RAN controller 101 in which case, the RAN controller sends the slice information to APP 402 (a). In turn, APP 402 translates this information into a new transaction (or Block) in Blockchain ledger 401 (a) which gets instantly distributed to all other Ledgers in step 2c. Other Ledgers may send an acknowledgement back to acknowledge success in step 3. Operator 2 views the Block using the Ledger Browser 670 (c) and decides to grab the slice in step 4(a). In one embodiment, APP 402 (c) may send a message to APP 402 (a) to request the fulfillment of the slice request in step 4b. That request is transmitted by App 402 (a) to RAN Controller 101 in step 5(a), and subsequently by RAN Controller 101 to Base Station 217 in step 5(b). An acknowledgement indicating success of the transaction from Base Station 217 to RAN Controller 101 to APP 402(a) to APP 402(c) are also shown in steps 5(c), 5(d) and 5(e) with OK messages. Once RAN controller 101 activates the slice for Operator 2, in step 5(b) it acknowledges APP 402 (a). Then a new Block is generated in the Ledger in step 6(b) listing Operator 2 as the lease of the slice for a specific duration. This new block is instantly distributed to all other Ledger instances in step 6 (c), and the success of the distribution is acknowledged by an ACK in step 7

Although a specific exemplary sequence of steps achieving the creation of a slice and the corresponding block in the ledger is shown in FIG. 4, the same task can be achieved by using a different sequence, or by deciding to engage or not engage some of the system components. Furthermore, blocks can be generated at reconfigurable time intervals as opposed to at each transaction. However, such sequences should be assumed covered within the scope of this invention as it is evident how to implement the system from these descriptions.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for a distributed ledger for base station slicing using blockchain. While various preferred embodiments have been shown and described, it will be understood that there is no intent to limit the invention by such disclosure, but rather, it is intended to cover all modifications falling within the spirit and scope of the invention, as defined in the appended claims.

The invention claimed is:

1. A method comprising:
    slicing, by a Radio Access Network (RAN) controller, base station capacity of a base station into one or more base station slices, the slicing covering one or more of (1) resource blocks each comprising a frequency and time slot of the base station; (2) data throughput; or (3) a transmission power level, wherein the base station capacity is owned by a base station owner;
    outputting, by the RAN controller, for storage to a first distributed ledger as a transaction in a block of transactions and for distribution with the block of transactions to a second distributed ledger that is a peer ledger of the first distributed ledger, slice information comprising data indicating one or more attributes defining a base station slice of the one or more base station slices;
    receiving, by the RAN controller, a request for the base station slice; and
    activating, by the RAN controller in response to the request, the base station slice in the base station.

2. The method of claim 1, wherein the base station owner is a mobile operator.

3. The method of claim 1,
    wherein the request for the base station slice indicates a request by a mobile operator to lease the base station slice, and
    wherein activating the base station slice in the base station comprises provisioning, by the RAN controller, the base station to deliver a service according to a provisioning file of the mobile operator.

4. The method of claim 1, wherein the request for the base station slice indicates a request by a mobile operator to lease the base station slice, the method further comprising:
    outputting, by the RAN controller after receiving the request, for storage to the first distributed ledger as another transaction in another block of transactions and for distribution with the another block of transactions to the second distributed ledger, data indicating the mobile operator is a lessee of the base station slice.

5. The method of claim 4, wherein the data indicating the mobile operator is a lessee of the base station slice also indicates a time duration for a lease of the base station slice.

6. The method of claim 1, further comprising:
    receiving, by an interface application, the slice information from the RAN controller; and
    generating, by the interface application, the block of transactions including the transaction; and
    storing, by the interface application, the block of transactions to the first distributed ledger.

7. The method of claim 6, wherein receiving the request for the base station slice comprises receiving the request from the interface application.

8. The method of claim 1, wherein the base station comprises a first base station, the base station owner comprises a first base station owner, the RAN controller comprises a first RAN controller, the slice information comprises first slice information, the one or more base station slices comprise one or more first base station slices, the base station slice comprises a first base station slice, and the block of transactions comprises a first block of transactions, the method further comprising:
    slicing, by a second RAN controller, base station capacity of a second base station into one or more second base station slices, the slicing covering one or more of (1) resource blocks each comprising a frequency and time slot of the second base station; (2) data throughput; or (3) a transmission power level, wherein the base station capacity of the second base station is owned by a second base station owner different than the first base station owner;
    outputting, by the second RAN controller, for storage to a third distributed ledger as a transaction in a second block of transactions and for distribution with the block of transactions to the second distributed ledger that is a peer ledger of the third distributed ledger, second slice information comprising data indicating one or more attributes defining a second base station slice of the one or more second base station slices of the base station capacity of the second base station;
    receiving, by the second RAN controller, a request for the second base station slice; and
    activating, by the second RAN controller in response to the request for the second base station slice, the second base station slice in the second base station.

9. The method of claim 8,
    wherein the request for the first base station slice indicates a request by a mobile operator to lease the base station slice and the request for the second base station slice indicates a request by the same mobile operator to lease the second base station slice, and
    wherein activating the first base station slice in the first base station and activating the second base station slice in the second base station pools RAN capacities of the first base station owner and the second base station owner for use by the mobile operator.

10. A Radio Access Network (RAN) controller comprising:
    processing circuitry and memory, the processing circuitry configured to:
    slice base station capacity of a base station into one or more base station slices, the slicing covering one or more of (1) resource blocks each comprising a frequency and time slot of the base station; (2) data throughput; or (3) a transmission power level, wherein the base station capacity is owned by a base station owner;
    output, for storage to a first distributed ledger as a transaction in a block of transactions and for distribution with the block of transactions to a second distributed ledger that is a peer ledger of the first distributed ledger, slice information comprising data indicating one or more attributes defining a base station slice of the one or more base station slices;
    receive a request for the base station slice; and
    activate, in response to the request, the base station slice in the base station.

11. The RAN controller of claim 10, wherein the base station owner is a mobile operator.

12. The RAN controller of claim 10,
    wherein the request for the base station slice indicates a request by a mobile operator to lease the base station slice, and
    wherein to activate the base station slice in the base station, the processing circuitry is configured to provision the base station to deliver a service according to a provisioning file of the mobile operator.

13. The RAN controller of claim 10,
wherein the request for the base station slice indicates a request by a mobile operator to lease the base station slice,
wherein the processing circuitry is configured to output, after receiving the request, for storage to the first distributed ledger as another transaction in another block of transactions and for distribution with the another block of transactions to the second distributed ledger, data indicating the mobile operator is a lessee of the base station slice.

14. The RAN controller of claim 13, wherein the data indicating the mobile operator is a lessee of the base station slice also indicates a time duration for a lease of the base station slice.

15. The RAN controller of claim 10, wherein to receive the request for the base station slice the processing circuitry is configured to receive the request from an interface application that interfaces directly with the first distributed ledger.

16. The RAN controller of claim 10,
wherein the base station comprises a first base station, the base station owner comprises a first base station owner, the RAN controller comprises a first RAN controller, the slice information comprises first slice information, the base station slice comprises a first base station slice, and the block of transactions comprises a first block of transactions, and
wherein the processing circuitry is configured to:
slice base station capacity of a second base station into one or more base station slices, the slicing covering one or more of (1) resource blocks each comprising a frequency and time slot of the base station; (2) data throughput; or (3) a transmission power level, wherein the base station capacity of the second base station is owned by a second base station owner different than the first base station owner;
output, for storage to a third distributed ledger as a transaction in a second block of transactions and for distribution with the block of transactions to the second distributed ledger that is a peer ledger of the third distributed ledger, second slice information comprising data indicating one or more attributes defining a second base station slice of the one or more base station slices of the base station capacity of the second base station;
receive, a request for the second base station slice; and
activate, in response to the request for the second base station slice, the second base station slice in the second base station.

17. The RAN controller of claim 16,
wherein the request for the first base station slice indicates a request by a mobile operator to lease the base station slice and the request for the second base station slice indicates a request by the same mobile operator to lease the second base station slice, and
wherein activating the first base station slice in the first base station and activating the second base station slice in the second base station pools RAN capacities of the first base station owner and the second base station owner for use by the mobile operator.

18. A non-transitory computer-readable medium comprising instructions for causing processing circuitry of a RAN controller to perform operations comprising:
slicing base station capacity of a base station into one or more base station slices, the slicing covering one or more of (1) resource blocks each comprising a frequency and time slot of the base station; (2) data throughput; or (3) a transmission power level, wherein the base station capacity is owned by a base station owner;
outputting, for storage to a first distributed ledger as a transaction in a block of transactions and for distribution with the block of transactions to a second distributed ledger that is a peer ledger of the first distributed ledger, slice information comprising data indicating one or more attributes defining a base station slice of the one or more base station slices;
receiving a request for the base station slice; and
activating, in response to the request, the base station slice in the base station.

\* \* \* \* \*